Aug. 9, 1932.  G. HERBSTER  1,871,369
THERMOSTATIC SWITCH
Filed Aug. 22, 1929
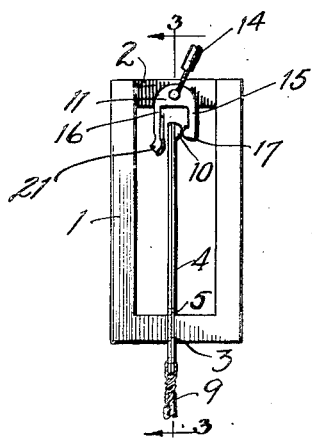
Fig. 1.
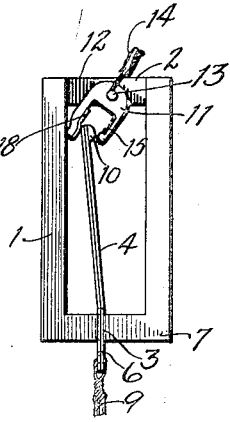
Fig. 2.
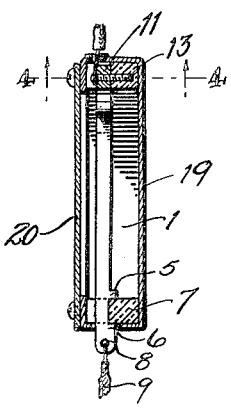
Fig. 3.
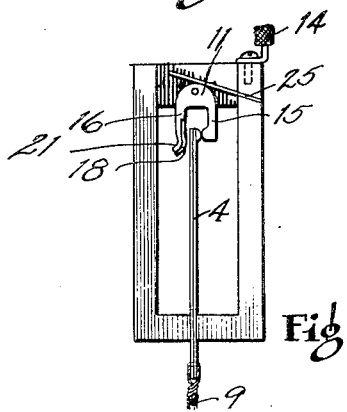
Fig. 5.
Fig. 4.
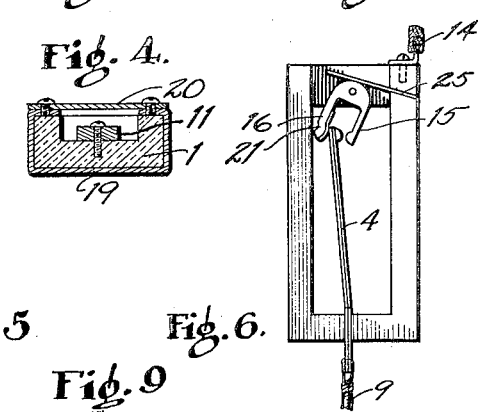
Fig. 6.
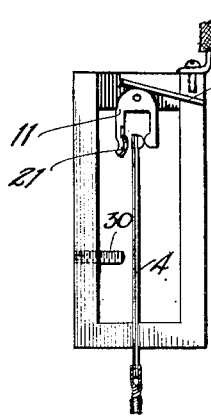
Fig. 7.
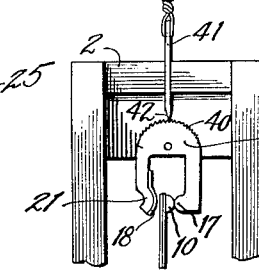
Fig. 9.
Fig. 8.
INVENTOR
George Herbster
BY Arthur H. Van Horn
His ATTORNEY Patented Aug. 9, 1932

1,871,369

UNITED STATES PATENT OFFICE

GEORGE HERBSTER, OF CLEVELAND, OHIO, ASSIGNOR TO THE BAUER IGNITION COMPANY, OF CLEVELAND, OHIO, A CORPORATION OF OHIO

THERMOSTATIC SWITCH

Application filed August 22, 1929. Serial No. 387,630.

My invention is an improvement in thermostatic electric switches.

Heretofore thermostatic switches have been employed to open or close an electric circuit at a predetermined rise in temperature. Where an apparatus of this kind is used in connection with household electrical appliances or devices, such as automatic igniting devices for gas burners or the like, difficulty has been experienced in quickly closing the igniter circuit after the burner flame is extinguished so that the fuel may be re-ignited almost immediately without waiting for the thermostat to return to its extreme closed circuit position. I have found that thermostatic devices now in use on automatic igniters respond to a rise in temperature upon the ignition of the fuel to open an electric circuit controlling the igniting device, but I do not find that such devices are capable of again closing the circuit until the temperature has dropped sufficiently to again return the thermostat to its original position when cool.

The chief difficulty experienced in the use of thermostatic electric switches located close to a source of heat, such as a flame or an energized electrical resistance, is that the thermostatic element will not cool rapidly enough with a drop in the temperature at such source, to return it to a normally closed or open circuit position, as may be desired in its particular application. For instance, when used in connection with electric igniters for gas burners in which the thermostatic element is normally in closed circuit position when cool to energize a sparker or resistance igniter at the burner, a rise in temperature at the burner will cause the thermostat to respond to open the circuit to de-energize the igniter.

In such instances a fuel feed valve operated switch is also usually employed in the circuit controlling the igniter. As the burner cools off, the return of the thermostatic element to the closed circuit position is retarded because the burner cools slowly. Therefore an unnecessarily long period of time is consumed by the movement of the thermostat to its limit of movement to the closed circuit position.

It is important in such devices that the thermostatic element be quickly returned to closed circuit position, since it may be desirable to re-ignite the fuel immediately after the flame has been extinguished without waiting for the thermostatic element to cool sufficiently to return to its extreme limit of movement in one direction to close the igniter circuit. Such instances arise, for instance, when the flame of one burner is inadvertently extinguished by operating the wrong valve, or when the flame is blown out by a gust of wind. Furthermore, devices of this kind in daily use are confined to operation at certain predetermined degrees of temperature and are not flexible.

It is an object of my invention to eliminate the difficulties hereinbefore encountered.

It is another object of my invention to open an electrical circuit at a predetermined rise in temperature, and to again close said circuit promptly upon a slight drop in said temperature, or vice versa.

A further object of my invention is to construct a thermostatic switch of the above named character, which is extremely simple in construction and inexpensive to manufacture.

Another object of my invention is to thermostatically open and close an electric circuit at predetermined temperatures at any point within a given range.

A further object of my invention is to provide a thermostat of the above named character which may be placed close to a burner or the like without danger of injury from high temperatures.

Other objects and advantages of my invention will become more apparent as the following description of several embodiments thereof progresses, reference being made to the accompanying drawing in which like reference characters are employed to designate like parts throughout the same.

In the drawing—

Fig. 1 is a front elevation of one form of my invention showing the contacts closed and the case and cover removed.

Fig. 2 is a view similar to Fig. 1, showing the deflection of the thermostatic element in response to a variation in temperature and showing the electric circuit broken.

Fig. 3 is a section taken on line 3—3 of Fig. 1, but showing the cover and case in place.

Fig. 4 is a section taken on line 4—4 of Fig. 3.

Fig. 5 is a front elevation of a second embodiment of my invention showing the contacts closed.

Fig. 6 is a view similar to Fig. 5, showing the thermostatic element deflected and the contacts open.

Fig. 7 is a front elevation of another form of my invention similar to that shown in Figs. 5 and 6. This figure also shows means for limiting the movement of the thermostatic element in one direction.

Fig. 8 is a view similar to Fig. 7 showing the thermostatic element deflected and the circuit open.

Fig. 9 is a part elevation of another embodiment of my invention, showing the contacts closed.

Referring now more particularly to Figs. 1, 2, 3 and 4, which are illustrative of one form of my invention, I have provided a body or frame 1 which is preferably molded from an insulated material capable of withstanding high temperature. This material may be of any desirable composition of matter, having as its base a material such as lava capable of resisting high temperatures. The frame 1 is preferably formed with a depression along one side as at 2, and a slot 3 extending through another side for receiving a thermostatic element 4 of the usual type employing strips of metal for different coefficients of expansion.

The thermostat 4 may be stamped from suitable materials and formed with lugs 5 and 6 near one of its ends, the lugs being spaced apart to engage opposite faces of the side 7 of the frame, as shown clearly in Fig. 3. In this manner, when the thermostat is inserted into the groove 3, longitudinal movement of the same will be prevented. The lug 6 is provided with an opening 8, whereby a conductor 9 may be secured thereto preferably by welding, since this thermostatic element is capable of use in high temperatures and the conductor 9 must be secured in such a way that high temperatures will not affect a loosening of this connection.

The upper end of the thermostat 4 carries a contact 10, which engages a contact on one arm of a movable substantially U-shaped contact member 11. The contact 11 is pivotally supported from the frame side member 12 by means of a pin 13, and is movable about the pin when pressure is exerted against either of its arms by the thermostat 4. A conductor 14 is secured to the pin 13 in a manner similar to that employed in connection with the conductor 9.

The contact 11 is a substantially inverted U-shaped member having depending arms 15 and 16 extending into the frame 1. The arm 15 is formed with a contact 17 for engagement with the contact 10. The arm 15 is insulated on its inner side, as shown at 18 to prevent electrical contact of the thermostat 4 with the contact 11 as the former is deflected to the left in Figs. 1 and 2.

I have provided a case 19 and cover plate 20 preferably formed of brass or other good heat conducting metal for enclosing the frame and the thermostatic element and contact members.

It will be noted that the arm 16 of the conductor 11 terminates in a portion curved slightly inwardly toward the thermostat 4 as at 21. In this manner the air gap between the contacts 10 and 17 is maintained at substantially the same distance for the entire range of movement of the thermostat 4 to the left in the figures.

The operation of this form of my invention is as follows:

In Fig. 1 the parts are shown in position for closing an electrical circuit between the conductors 9 and 14. Assuming that the device is located close to a source of heat such as a gas burner flame, and assuming that the conductors 9 and 14 are connected in a burner igniter circuit, energization of this circuit will cause a spark to jump at a predetermined point to ignite the fuel as it issues from the burner. The rise in temperature thus created is immediately transmitted through the heat conducting surfaces of the container or case to the thermostatic element 4, which quickly responds by deflection toward the left, as shown in Fig. 2. As the thermostat moves toward the left, it disengages the contacts 10 and 17 and engages the insulated strip 18 and the contact 11 is swung about the pin 13 toward the position shown in Fig. 2, thus immediately de-energizing the igniting circuit.

Since the thermostat arm 4 moves but a very short distance before it engages the insulated arm 16 of the contact 11, the air gap between the separated contacts 10 and 17 is also very limited and remains so for the entire travel of the thermostat 4 to the left. It will be noted that the contact 17 is automatically advanced with the contact 10, when the thermostat is deflected, so that a very slight cooling of the thermostat will restore the contacts to engagement. In the event that the flame of the burner is accidentally extinguished, it will therefore not be necessary for the heated burner to cool off to any great extent before the thermostat tends to assume its normal vertical position. Therefore, a very slight drop in temperature will cause the thermostat to close the limited gap between the contacts 10 and 17 to again energize the igniting circuit, whereupon a spark is delivered to the burner to re-ignite the fuel. This re-ignition is accomplished very quickly and almost immediately after the flame has been accidentally extinguished, and prevents the escape of fuel, which might, under certain circumstances, be dangerous. The device will operate in the same manner when a fuel feed valve of the type associated with an electric switch is turned off and immediately turned on again.

It will be noted when the thermostat 4 is deflected to the postion shown in Fig. 1, that although the igniting circuit is broken, the gap between the contacts 10 and 17 is so restricted that a very slight drop in temperature will cause these contacts to be brought back into engagement. In other words, as the thermostat is deflected the contact arm 15 also advances with the thermostat to main-ain a restricted air gap between the contacts 10 and 17, which would otherwise become great if the contact 15 were stationary.

Referring now more particularly to Figs. 5 and 6, in which I have illustrated a second embodiment of my invention, I have shown substantially the same structure as that shown in Figs. 1 to 4 inclusive. However, in connection with this embodiment I have provided a leaf spring 25 supported in a groove in the frame 1. A screw 26 secures the spring in the groove and serves as a connector for this conductor 14. This spring extends over and engages the upper curved surface of the contact 11 and normally exerts its tension upon the contact, as shown in Fig. 5, offer slight resistance to movement of the contact 11, due to the response of the thermostat to a variation in temperature.

The operation of this form of my invention is substantially the same as that illustrated in Figs. 1 to 4 inclusive.

In Figs. 7 and 8 I have illustrated the still further embodiment of my invention, substantially the same as that shown in Figs. 5 and 6, with the exception that I have provided means for limiting the movement of the thermostat in one direction. This means includes a set screw 30 operable through a side of the frame 1 to engage the element 4. In this manner the thermostat may be restricted to operation at a desired temperature within a predetermined range of high temperatures.

In Fig. 9 I have illustrated a fourth embodiment of my invention, which is similar to the form shown in Figs. 1 to 4 inclusive, but which differs in that the pivoted contact 11 is provided with a series of serrations or teeth 40 on its upper curved surface. A dog 41 formed of a short strip of spring metal is seated in a groove in the frame member 2 and extends with its pointed end 42 in engagement with the teeth 40. The strip is connected with the conductor 14 and is in electrical contact with the member 11. In this form of my invention the pointed end of the strip offers a slight resistance to the movement of the member 11, but not sufficiently to hinder the movement of the thermostat 4.

Various changes in the details of construction may be made without departing from the spirit of my invention or the scope of the appended claims.

I claim:

1. A thermostatic electric switch comprising a pivoted conductor having depending arms, a thermostat comprising another conductor operable between the arms to engage one of them in electrical contact during the movement of said thermostat in one direction, and to engage another of said arms during the movement of the thermostat in another direction, said pivoted conductor adapted to be propelled by said thermostat in either direction in response to a variation in temperature.

2. A thermostatic electric switch comprising a pivoted conductor having depending arms, a thermostat for propelling the conductor in either direction about its pivot and comprising another conductor operable between the arms and relatively movable thereto, whereby the limit of movement of the thermostat between said arms in response to any variations of temperature within its range, is relatively short.

3. A thermostatic switch comprising a casing, a substantially U-shaped member pivotally mounted in the casing one arm of which constitutes an electrical contact, a thermostatic element within the casing and having a free end extending between the arms of said U-shaped member and engageable with the contact to complete an electric circuit in response to a variation in temperature in one direction, said contact being movable with said thermostatic element and in slightly spaced relation thereto in response to a variation in temperature in an opposite direction.

4. A thermostatic switch comprising a casing, a substantially U-shaped member pivotally mounted in the casing one arm of which constitutes an electrical contact, a thermostatic element within the casing and having a free end extending between the arms of said U-shaped member and engageable with the contact to complete an electric circuit in response to a variation in temperature in one direction, said thermostatic element engaging another arm of said U-shaped member but out of electrical contact therewith to tilt said member and advance said contact with said element in slightly spaced relation thereto, upon a variation in temperature in an opposite direction.

5. In a thermostatic electric switch, a thermally responsive element, a contact in the path of movement of said element for electrical engagement therewith and insulated means in the path of movement of said element to permit movement of said element and said contact in slightly spaced relation upon a variation in temperature in one direction.

6. A thermostatic switch comprising a casing, a substantially U-shaped member pivotally mounted in the casing one arm of which constitutes an electrical contact, a thermostatic element within the casing and extending between the arms of said U-shaped member and engageable with the contact arm to complete an electrical circuit, and means for exerting a pressure on said U-shaped member whereby movement of said member by the thermostat in response to a variation in temperature is slightly resisted.

7. A thermostatic switch comprising in combination, a casing, a substantially U-shaped member pivotally mounted in the casing one arm of which constitutes an electrical contact, a thermostatic element within the casing and extending between the arms of said U-shaped member to move the same about its pivot and engageable with the contact to complete an electric circuit, means for exerting a slight pressure on said U-shaped member resisting the movement of said member, and adjustable means for limiting movement of the thermostat in one direction.

In testimony whereof, I hereunto affix my signature this 10th day of August, 1929.

GEORGE HERBSTER.